J. P. WEIDEMEYER.
ATTACHMENT FOR SAWING MACHINES.
APPLICATION FILED SEPT. 9, 1912.
1,064,946.
Patented June 17, 1913.
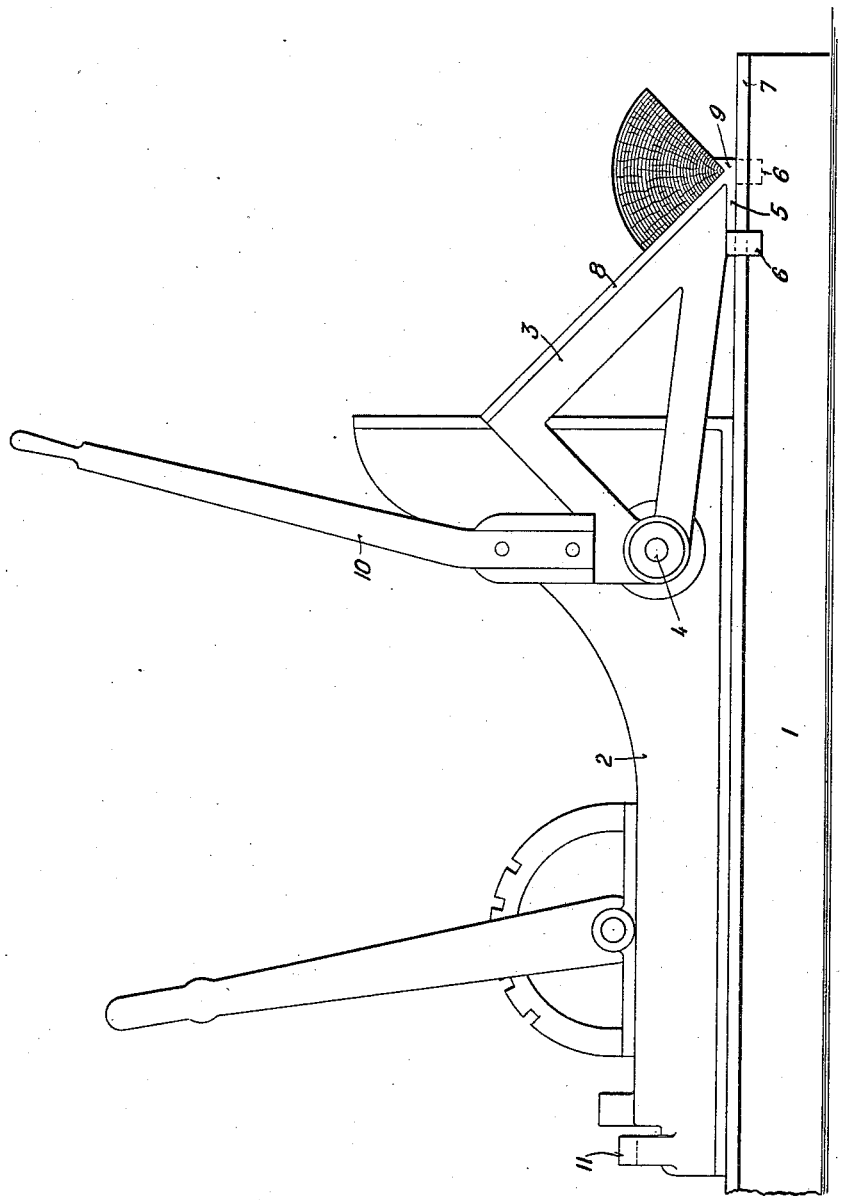

UNITED STATES PATENT OFFICE.

JOHN P. WEIDEMEYER, OF COAL GROVE, OHIO.

ATTACHMENT FOR SAWING-MACHINES.

1,064,946.  Specification of Letters Patent.  Patented June 17, 1913.

Application filed September 9, 1912. Serial No. 719,292.

*To all whom it may concern:*

Be it known that I, JOHN P. WEIDEMEYER, a citizen of the United States, residing at the village of Coal Grove, in the county of Lawrence and State of Ohio, have invented certain new and useful Improvements in Attachments for Sawing-Machines, of which the following is a specification.

My invention is directed to an attachment for saw mill machinery, to provide a holder or support, primarily for scant quartered logs, whereby the bisecting vertex line is coincident or parallel with the cutting plane of the saw. To produce the beautiful effects of the quartered figures of the wood it is necessary to cut along a line which most nearly approaches the true radius of the log. In the general methods now practised for quarter sawing boards, the arc of the sector functions as the base, which rests upon the head blocks or carriage of the sawing machine. Thus owing to the irregularity of the arc, it is a difficult matter to properly dog or clamp the sector to present a radius line coincident with the cutting plane of the saw, as it requires considerable skill, delicate adjustment and gaging. As only a very limited number of boards can be cut from the sector or quartered log section it is readily apparent that most ardent efforts are required to produce the cut of boards most acceptable for the purposes intended.

I am aware that veneer sawing machines have been provided with holders for quartered logs wherein one of the radii surfaces serves as a base, with the holder adjustable to various angles to saw with the grain along lines which radiate from the center to the circumference of the log, and after making several parallel at a given setting, readjustments are made for successive cuttings, and again skill of the operator is a desideratum.

With my invention quarter sawing can be readily and conveniently accomplished upon the most obvious type of general sawing machine, and with an unskilled sawer. It provides a wider field of usefulness for the sawing machine, in that general ripping or board sawing can be done, or the log initially sawed into boards preparatory to the production of the scant quarters and the quartered section quarter saw without necessitating complicated adjustments to be made for each change, or any dependence upon the skill of the operator.

An object therefore, of my invention is to provide an attachment for sawing machine comprising a holder for a log sector having permanent radii surfaces coincident with the radii surfaces of the sector or quartered log, to receive and support the log section in such relative position whereby the accuracy of its bisecting vertex line is coincident or parallel with the cutting plane of the saw.

Another object of my invention is to provide a work holder for sawing machines having a pair of relatively opposing work supporting surfaces of a definite angle between which the work is directly supported.

Another object of my invention is to provide an attachment for sawing machines comprising a holder having intersecting angular work receiving surfaces mounted upon the head block of a sawing machine and adapted to be swung into and out of an operative position, with its work supporting end guided and maintained against displacement.

Another object of my invention is to provide a work holder for sawing machines with work receiving surfaces arbitrarily receiving and supporting a log section to definitely locate a radius bisecting line of the log section relatively with the cutting plane of the saw.

The features of my invention are more fully set forth in the description of the accompanying drawings, forming a part of this specification in which the figure represents an end elevation of a portion of a sawing machine, primarily for sawing logs with my work holder applied and in position for use, illustrating a quartered log supported thereon in position to be cut into boards having their face surfaces cut along a radius line of the log with the grain or parallel therewith.

In the drawings I have only illustrated so much of a log sawing machine as is requisite for a clear understanding of my improvement.

1 represents the head-block of a sawing machine which ordinarily is mounted upon a carriage, and 2 a knee mounted and movable upon the head block, with all their parts or elements of ordinary construction; detailed description and illustration thereof is herein omitted as they are well understood in the art.

3 represents a supplemental knee or work holder pivotally mounted at 4 to the knee 2. This knee 3 presents a triangular outline with a foot portion 5 flanging from the knee 3 and resting upon the head-block 1.

6 represents lugs projecting from the foot 5, preferably one upon each side thereof, overlapping and engaging the sides of the head-blocks way 7, to prevent lateral displacement of the knee, or disturb its position relative with the cutting plane of the saw.

8 represents a flange formed along one edge of the knee 3, extending rearwardly from the foot 5 and at an angle when the knee is in normal position upon the head-block, corresponding to a radius line of the quartered log section which is mounted upon the flange. In the instance illustrated the flange surface is at an incline of forty-five degrees to the head-block as a base, alining a vertex bisecting line of the quartered log coincident with the cutting plane of the saw when one radii surface thereof rests upon the holder. This angular holder surface intersects a relatively opposing angular surface of a nose projection 9, to receive the opposite radius surface of the quartered log, thus producing a V-notch for the reception of the apex of the log section which functions as the base therefor, instead of the arc surface in the present methods of mounting for quarter sawing. The angular nose surface is of a comparatively small area but sufficient to hold the log section against displacement and therefore provide saw clearance for the first board cuts.

In the preferred mode of operation a cut parallel with a bisecting vertex radius line would be made cutting away a three-cornered piece and producing a surface upon the quartered log parallel with the work receiving surface of the main knee 2, against which the same can be clamped, offering a convenient and accurate gaging surface in cutting the remainder portion of the log section. The residue sector pieces emitted from such quarter sawing are admirably conditioned for further sawing upon a horizontal re-sawing machine, they having one of their faces cut on a radius line, which face is placed face downward upon the carriage of the re-sawing machine, enabling a series of cuts to be made. In this last step the boards produced present a comparatively high grade surface in its beautifying effect of grain lines, materially increasing the percentage of the grade of lumber produced from a log, and with my improvement, also materially decreasing the percentage of loss on the edge cutting machine.

10 represents a handle fixed to the knee 3, which is utilized for swinging the knee into and out of commission.

11 represents a catch formed upon the rear portion of the main knee 2 with which the handle 10 engages to lock the auxiliary knee in an inoperative position away from interference when the machine is used for ordinary sawing.

It is obvious that the principal features of my improvement could be embodied in a general knee producing the two-fold functions of the main and auxiliary knees in a unitary structure combined to produce the results as above described without a departure from the objects of my invention, and I therefore do not wish to be herein limited to the form shown except as specifically made mention of in the claims.

Having described my invention, I claim:—

1. In a sawing machine, a head-block, a work holder knee movably mounted therein, said knee having intersecting angular work receiving surfaces to receive and support the radii surfaces of a log sector, with the bisecting vertex line of the sector parallel with the cutting plane of the saw.

2. In a sawing machine, a head-block, a main knee movable on said head-block, a supplemental knee pivotally mounted on said main knee adapted to be swung into an operative position and engage with the head-block and slide thereon, said supplemental slide having angular work receiving surfaces of definite predetermined angle co-ordinate with surfaces of the work to present the same to the saw with the bisecting line parallel with the cutting plane.

In testimony whereof, I have hereunto set my hand.

JOHN P. WEIDEMEYER.

Witnesses:
 OLIVER B. KAISER,
 CLARENCE B. FOSTER.

Copies of this patent may be obtained for five cents each, by addressing the "Commissioner of Patents, Washington, D. C."